(12) United States Patent
Ackley et al.

(10) Patent No.: US 11,029,999 B1
(45) Date of Patent: Jun. 8, 2021

(54) LOTTERY-BASED RESOURCE ALLOCATION WITH CAPACITY GUARANTEES

(71) Applicant: Amazon Technologies, Inc., Seattle, WA (US)

(72) Inventors: Chance Ackley, Royal Oak, MI (US); Fletcher Liverance, Oakland, CA (US); Long Nguyen, Detroit, MI (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/124,118

(22) Filed: Sep. 6, 2018

(51) Int. Cl.
*G06F 9/46* (2006.01)
*G06F 9/48* (2006.01)
*G06F 9/50* (2006.01)
*H04L 29/08* (2006.01)
*H04L 12/911* (2013.01)

(52) U.S. Cl.
CPC .......... *G06F 9/4881* (2013.01); *G06F 9/5005* (2013.01); *H04L 47/72* (2013.01); *H04L 67/10* (2013.01); *G06F 2209/5011* (2013.01)

(58) Field of Classification Search
CPC ........................................................ G06F 9/52
USPC ............................................................ 718/104
See application file for complete search history.

(56) References Cited

U.S. PATENT DOCUMENTS

| | | | |
|---|---|---|---|
| 5,996,013 A * | 11/1999 | Delp .................... | G06F 9/5027 370/232 |
| 7,058,949 B1 * | 6/2006 | Willen .................. | G06F 9/4881 718/102 |
| 7,577,780 B2 * | 8/2009 | Huang .................. | G06F 13/362 710/116 |
| 7,716,275 B1 * | 5/2010 | Nagaralu .............. | G06F 9/5011 709/203 |
| 8,515,904 B1 * | 8/2013 | Dwyer, III .......... | G06F 16/1827 707/609 |
| 8,555,274 B1 * | 10/2013 | Chawla ................ | G06F 9/452 718/1 |
| 10,162,683 B2 * | 12/2018 | Harris .................. | G06F 9/5083 |
| 2005/0066134 A1 * | 3/2005 | Tormasov ............. | G06F 16/10 711/151 |

(Continued)

OTHER PUBLICATIONS

Carl A. Waldspurger et al., "Lottery Scheduling: Flexible Proportional-Share Resource Management," the 1994 Operating Systems Design and Implementation conference (OSDI '94), Nov. 1994, pp. 1-11.

*Primary Examiner* — Mehran Kamran
(74) *Attorney, Agent, or Firm* — Robert C. Kowert; Kowert, Hood, Munyon, Rankin & Goetzel, P.C.

(57) ABSTRACT

Methods, systems, and computer-readable media for lottery-based resource allocation with capacity guarantees are disclosed. A job request is received from a first client. The job request is submitted to a capacity management system that schedules jobs in a pool of compute resources. The pool comprises a first quantity of one or more slots and a second quantity of one or more slots. The second quantity is associated with a capacity guarantee for a second client. It is determined that the first quantity of one or more slots are in use by one or more jobs initiated prior to receiving the job request. It is determined that the second quantity of one or more slots comprises an available slot. The available slot is allocated to the job request.

20 Claims, 9 Drawing Sheets

(56) References Cited

U.S. PATENT DOCUMENTS

| | | | | |
|---|---|---|---|---|
| 2007/0261082 A1* | 11/2007 | Ji | H04N 21/44245 | 725/62 |
| 2008/0126547 A1* | 5/2008 | Waldspurger | G06F 3/0653 | 709/226 |
| 2011/0231853 A1* | 9/2011 | Murray | G06F 9/50 | 718/103 |
| 2011/0238546 A1* | 9/2011 | Certain | G06Q 30/0284 | 705/34 |
| 2011/0302578 A1* | 12/2011 | Isci | G06F 9/5077 | 718/1 |
| 2012/0222035 A1* | 8/2012 | Plondke | G06F 9/4881 | 718/103 |
| 2013/0166727 A1* | 6/2013 | Wright | G06F 3/0659 | 709/224 |
| 2013/0263148 A1* | 10/2013 | Brueggen | G06F 9/5016 | 718/104 |
| 2013/0290543 A1* | 10/2013 | Lochhead | G06F 9/5072 | 709/226 |
| 2013/0301652 A1* | 11/2013 | Oz | G06F 9/5022 | 370/468 |
| 2013/0326064 A1* | 12/2013 | Gulati | H04L 47/805 | 709/226 |
| 2013/0346993 A1* | 12/2013 | Chen | G06F 9/5044 | 718/103 |
| 2014/0282629 A1* | 9/2014 | Gupta | H04L 67/1012 | 719/328 |
| 2015/0271092 A1* | 9/2015 | Ward, Jr. | H04L 67/10 | 709/226 |
| 2015/0277987 A1* | 10/2015 | Di Balsamo | G06F 9/5083 | 718/104 |
| 2016/0139959 A1* | 5/2016 | Iwata | G06F 9/5027 | 718/103 |
| 2016/0239322 A1* | 8/2016 | Watanabe | G06F 9/45558 | |
| 2016/0306672 A1* | 10/2016 | Chin | G06F 9/505 | |
| 2016/0380905 A1* | 12/2016 | Wang | G06F 9/5077 | 709/226 |
| 2017/0331759 A1* | 11/2017 | Li | H04L 41/5054 | |
| 2018/0095803 A1* | 4/2018 | Walsh | G06F 9/5016 | |
| 2018/0234354 A1* | 8/2018 | Dravneek | G06Q 30/0251 | |
| 2020/0028911 A1* | 1/2020 | Sun | G06F 3/0614 | |
| 2020/0104066 A1* | 4/2020 | Waldspurger | G06F 3/0653 | |

* cited by examiner

LOTTERY-BASED RESOURCE ALLOCATION WITH CAPACITY GUARANTEES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Complex systems may include many services that interact with one another in varied ways. For example, a distributed or cloud-based system may offer execution services for executing client-supplied tasks.

Figure 1:
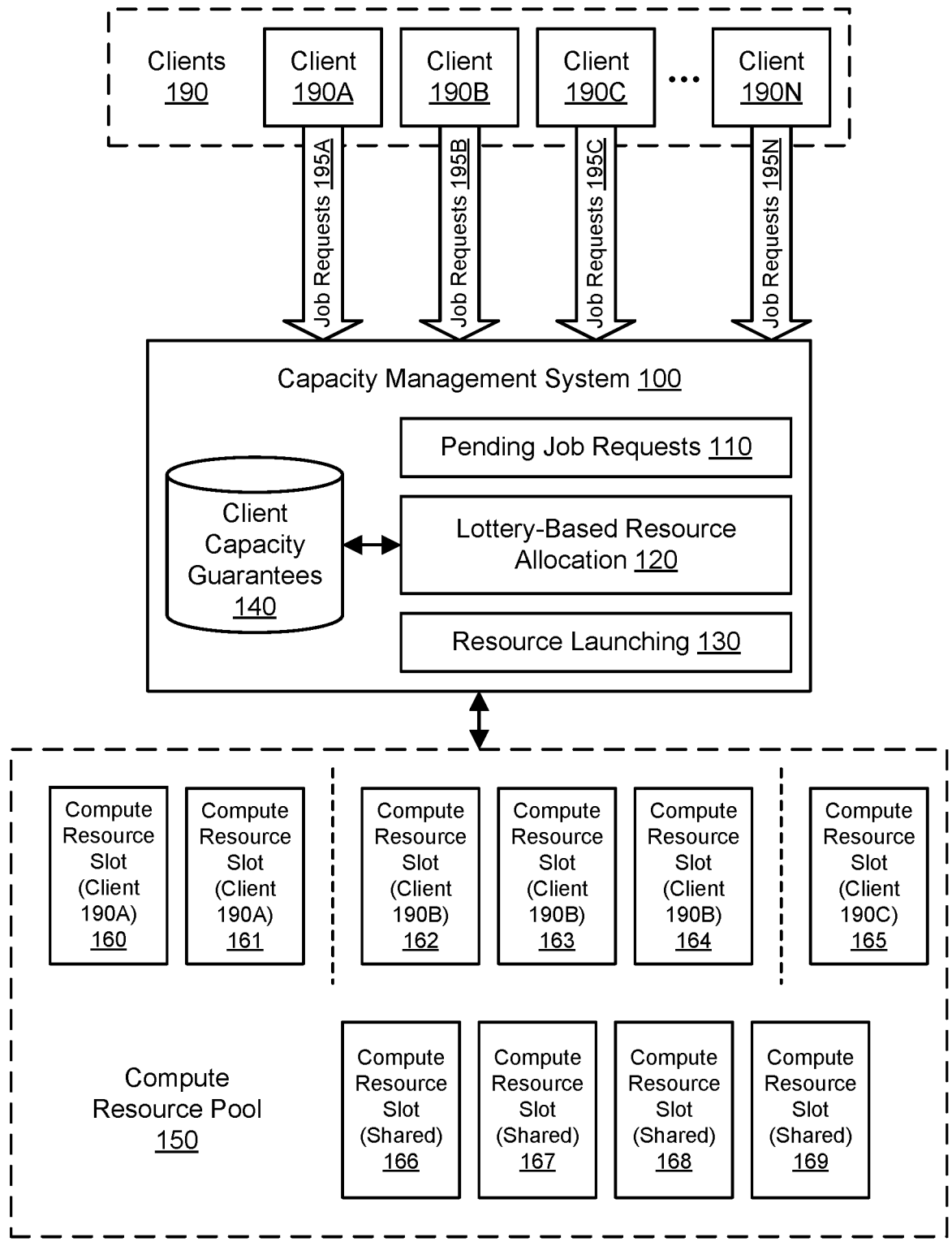
FIG. 1 illustrates an example system environment for lottery-based resource allocation with capacity guarantees, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for lottery-based resource allocation with capacity guarantees are described. In various embodiments, compute resources such as compute clusters may be allocated equitably to multiple clients while respecting capacity guarantees for particular clients. Clients may submit job requests to a capacity management system that manages access to one or more pools of compute resources. Clients may submit jobs using client-specific work queues. In one embodiment, the resources within a pool may be substantially homogeneous in terms of their capabilities (e.g., the processor and memory configurations of individual nodes may be the same, and/or each cluster may have the same number of nodes), but a resource type or configuration of one pool may differ from a resource type or configuration of another pool. A pool of compute resources may have a number of "slots" in which resources can be launched to run jobs; the number of slots may represent the number of jobs that the pool can run concurrently. The total number of slots may represent a total capacity of compute resources at a given time. A particular client may have an agreement (a capacity guarantee) in place with the capacity management system that the system will provide N slots for that client at a given time. Although the set of N slots may appear to the client to be restricted to the client's jobs, the system may use those slots for other clients, e.g., at times when the client has left them idle. The system may also permit the client to exceed the client's capacity guarantee by allocating slots other than the client's N slots, e.g., at times when the other slots have been left idle by other clients. When a slot is available to run a job, the system may use a lottery-based algorithm to select one of the pending job requests for that slot. The lottery-based algorithm may assign a number of "tickets" to each client with a pending request. The number of tickets may vary from client to client based (at least in part) on the number of active jobs for a client, the number of total slots for all clients, and/or the number of dedicated slots for this client. Using these techniques, the system may be able to better utilize the capacity of a pool while both overpromising and overdelivering, such that the total number of slots collectively guaranteed to multiple clients may exceed the total number of actual slots in the pool.

As one skilled in the art will appreciate in light of this disclosure, embodiments may be capable of achieving certain technical advantages, including some or all of the following: (1) improved utilization of compute resources in a multi-tenant provider network, such that fewer resources are left idle while client-specific capacity guarantees are observed; (2) decreased latency for processing job requests from multiple clients; (3) improvement in a metric that measures client perceptions of fairness; and so on.

FIG. 1 illustrates an example system environment for lottery-based resource allocation with capacity guarantees, according to one embodiment. A capacity management system 100 may offer access to a compute resource pool 150 to a set of clients 190. As shown in the example of FIG. 1, the clients 190 may include client 190A, client 190B, and client 190C through client 190N; however, any number and configuration of clients may interact with the system 100. Clients 190A-190N may represent different entities or accounts and may have agreements in place with the system 100 to run client-submitted jobs, e.g., according to a fee structure. In one embodiment, clients 190A-190N may be part of the same business entity that owns or operates the capacity management system 100 and/or compute resource pool 150. In one embodiment, at least some of the clients 190A-190N may be part of different business entities than the entity that owns or operates the capacity management system 100 and/or compute resource pool 150.

Clients 190 may submit job requests to the system 100, where the requests may be queued or buffered as pending job requests 110 until allocated to slots in the compute resource pool 150 (or cancelled without allocation). In one embodiment, at least some of the clients 190 may have individual, isolated, and/or dedicated work queues by which the clients may submit job requests to the system 100. As shown in the example of FIG. 1, client 190A may submit its job requests 195A through a dedicated work queue that other clients 190B-190N cannot access, client 190B may submit its job requests 195B through another dedicated work queue that the other clients cannot access, client 190C may submit its job requests 195C through yet another dedicated work queue that the other clients cannot access, and/or client 190N may submit its job requests 195N through an additional dedicated work queue that the other clients cannot access. A job request may represent an instruction to perform one or more tasks. A job request may indicate elements such as the logic or code to be executed (e.g., transformations of input data into output data), the input values or location thereof, the format of the input, the location to which the output should be sent or stored, the format of the output, and so on. In one embodiment, a job request may indicate a minimum or preferred hardware and/or software configuration of a compute resource on which to run the job. For example, a particular job may require a compute cluster having a particular number of nodes, where the nodes are similarly configured with a minimum amount of random-access memory. In one embodiment, the job requests 195A-195N may be expressed according to a common format. In one embodiment, the job requests 195A-195N may be submitted to the system 100 using appropriate application programming interfaces (APIs) or other programmatic interfaces, e.g., over a network that couples the clients 190 and the system 100.

The job requests 195A-195N may represent a variety of domains and use cases, such as batch processing and stream processing use cases. Suitable transformations specified by job requests may include decoration of data with metadata, aggregation of data, division of data, logging of data, and so on. For example, job requests may be used to implement migration of data warehousing from one data warehousing environment (e.g., Oracle Real Application Clusters) to a different data warehousing environment (e.g., Apache Spark). As another example, job requests may be used to implement call/response patterns for RESTful (representational state transfer) APIs (application programming interfaces). As a further example, job requests may be used to implement queue processing for transformation and data chunking, e.g., for streamed data. As yet another example, job requests may be used to implement logic for database indexing, including the ability to redefine index configurations in real-time. Additionally, job requests may be used to implement engine-independent transformations in data analytics, machine learning pipelining, log manipulation, database micro-batch ingestion, and many other domains.

In one embodiment, a client may build a job request that performs a data transform as an SQL-like batch data processing job. The client may use a user interface associated with the system 100 to view a curated list of datasets to which the client has read access. The client may select one or more of those datasets to be used as data producers for the new job. The client may use another aspect of the user interface to apply filters, simple joins, and logical expressions to curate the data set with respect to a critical set of attributes. The client may then indicate one or more data consumers for the curated dataset, e.g., a destination or target from which the curated dataset can be picked up by downstream services. The job request may be built by the system 100 based on the client's indication of the desired data producers(s), transformation(s), and data consumers(s). As a further example of such a task, a product manager at an online retailer may select a merchant, product ID, and offer feature tables as the data sources. The product manager may indicate that filters should be applied to select only professional sellers, product IDs with high user ratings, and qualifying offers. The product manager may indicate that the merchant data, product ID data, and offer data should be joined to get a curated list of high value and high star ratings. The product manager may then indicate that the curated dataset should be published back to the system or service that provided the source data. Additionally, the product manager may indicate that sellers should be sent notifications that these high value offers qualify for special treatment by the merchant in order to boost sales. Such a job request may be executed using a compute resource in the pool 150, as allocated by the capacity management system 100.

In one embodiment, a client may use the system 100 to build a job request that performs inventory pipeline processing as a stream processing job. The client may indicate that the data source is a particular stream available on a data streaming service, and the input data represents an inventory event (e.g., associated with an online merchant) including the store, seller, product ID, fulfillment network, quantity, and timestamp of the event. In one embodiment, a store is implemented using a collection of network-accessible services executed on computer hardware. The network-accessible services may provide multiple channels (e.g., a mobile app, a voice-based search, web access, a physical presence, etc.) through which customers (using client computing devices) can access various catalogs stored in databases to find various products and services available to purchase or lease. The products and services may be described and offered in the form of detail pages.

The client may seek to query a particular table to filter out updates to non-professional sellers and also query an inventory analyzer service to retrieve thirty-day sales information. The client may then seek to use the sales information and current inventory quantity to predict when the product will go out of stock, create a low inventory nudge if it will go out of stock in under twenty-one days, create an out of stock nudge if the quantity is zero, and deindex any current nudges for that offer if neither condition is met. By building such a job request, a developer need not have to code and maintain the business logic as a separate service or executable component. Additionally, a business-oriented client could update the job request without having to change any underlying executable program code, e.g., to account for inbound quantity and not create a low inventory nudge if an inbound shipment will be received before the item is predicted to be out of stock. Such a job request may be executed using a compute resource in the pool 150, as allocated by the capacity management system 100.

In one embodiment, the compute resource pool 150 may have (or be characterized by) a number of slots that can be used to run jobs submitted by clients 190. A compute resource may be launched in a slot in order to run a job to which the slot has been allocated. As shown in the example of FIG. 1, the pool 150 may include ten slots: slot 160, slot 161, slot 162, slot 163, slot 164, slot 165, slot 166, slot 167, slot 168, and slot 169. The number of slots may represent the maximum number of jobs that the pool 150 can run concurrently. Not all of the slots 160-169 may be in use at a given time; a slot not in use may be said to be idle. The total number of slots may represent a total capacity of compute resources in the pool 150 at a given time. In one embodiment, the number of slots in the pool 150 may be fixed and may change only with manual intervention by a system administrator. In one embodiment, the number of slots in the pool 150 may be dynamic and may be changed by the system 100 itself in the absence of direct user input, e.g., to meet increased or decreased demand from clients 190, to increase the size of the pool when resource costs drop, to decrease the size of the pool when resource costs rise, and so on. In one embodiment, the capacity (e.g., number of slots) of the pool may be increased when the system 100 is unable to honor one or more capacity guarantees, e.g., instead of preempting running jobs or using a lottery for clients with unmet capacity guarantees.

In one embodiment, using a resource launching component 130, a compute resource may be launched upon allocation of the slot to a job and not necessarily kept running when no job is active in the slot. In one embodiment, the resource launching component 130 may interact with a resource manager of a multi-tenant provider network to select, reserve, provision, and/or configure appropriate compute resources from a set of available compute resources offered by the provider network. In one embodiment, the resource launching component 130 may configure and launch compute resources that are specific to the resource pool 150 and not available outside the pool. In one embodiment, the compute resource pool 150 may be associated with a set of compute resources that are substantially homogeneous in their capabilities and/or configuration. For example, any compute resource launched into a slot in the pool 150 may include a compute cluster with a particular number of nodes. As another example, each node in a cluster in the pool 150 may have the same processor and memory capabilities and configuration. As yet another example, if a compute resource represents an individual compute instance and not a cluster, then the set of instances usable with the pool 150 may be substantially similar in their capabilities and configuration, e.g., such that the instances are of the same instance type.

In one embodiment, at least some of the clients 190 may have agreements (capacity guarantees) in place with the capacity management system that the system will provide a particular number of slots for a client at any given time. For example, client 190A may be guaranteed two slots (representing two concurrently executing jobs), client 190B may be guaranteed three slots (representing three concurrently executing jobs), client 190C may be guaranteed one slot (representing one concurrently executing job), and client 190N may be guaranteed no slots in the pool 150. Such agreements may be stored by the capacity management system 100 as client capacity guarantees 140. The capacity guarantees 140 may be used by the system 100 in allocating slots 160-169 to particular clients.

Based on the capacity guarantees 140, the pool 150 may appear to be partitioned such that some slots are restricted, isolated, or otherwise dedicated to particular clients. For example, slots 160 and 161 may appear to be dedicated to client 190A (with a capacity guarantee of two slots), slots 162-164 may appear to be dedicated to client 190B (with a capacity guarantee of three slots), and slot 165 may appear to be dedicated to client 190C (with a capacity guarantee of one slot. The pool 150 may also include "shared" slots 166-169 that are not dedicated to any particular client. Because the slots 160-169 may appear to be partitioned into individual client-specific pools, the total pool 150 may also be referred to as an ocean. In some embodiments, however, the slots 160-169 may be collectively used for all clients 190. In one embodiment, any of the slots 160-169 may be used by any of the clients 190. In one embodiment, a slot that "belongs" to one client but is idle may be used by another client. For example, an idle slot 160 (that may appear to be dedicated to client 190A) may be used as burst capacity for client 190C that is experiencing an unexpected peak in its job requests. In one embodiment, idle slots may also be used to permit a client to exceed its capacity guarantee. For example, if client 190A has two jobs running (e.g., in its "dedicated" slots 160 and 161) and is thus at its capacity guarantee, the system 100 may allocate other slots (e.g., slots 162-169) to that client. Using these techniques for better utilizing the capacity of the pool 150, the system 100 may both overpromise and overdeliver with respect to compute capacity. In one embodiment, the total number of slots collectively guaranteed to multiple clients may exceed the total number of actual slots in the pool. In one embodiment, the capacity management system 100 may increase throughput and utilization of the compute resource pool 150. In one embodiment, the capacity management system 100 may decrease the wait time for jobs to start and/or the run time for jobs.

Using the techniques described herein, the system 100 may fairly allocate jobs to slots on behalf of multiple clients 190. When a slot is available to run a job, the system 100 may use a lottery-based resource allocation component 120 to select one of the pending job requests for that slot. In one embodiment, the resource allocation component 120 may use an allocation method that aims to allocate compute capacity according to some fairness metric. In one embodiment, the resource allocation component 120 may implement a lottery-based algorithm to assign a number of "tickets" to each client with a pending request. The number of tickets assigned to a client may represent the client's probability of being allocated the available slot. The number of tickets may vary from client to client based on various factors. In one embodiment, the number of tickets may vary for a client based (at least in part) on the number of active jobs in the pool 150 for the particular client. In one embodiment, the number of tickets may vary for a client based (at least in part) on the number of total slots for all clients. In one embodiment, the number of tickets may vary for a client based (at least in part) on the number of dedicated slots for the particular client. Using these techniques, the system 100 may observe client-specific capacity guarantees 140 while also equitably utilizing the compute resources of the pool 150. In one embodiment, the capacity management system 100 may increase the perception of fairness across all clients 190, e.g., as measured by a fairness metric.

Figure 8:
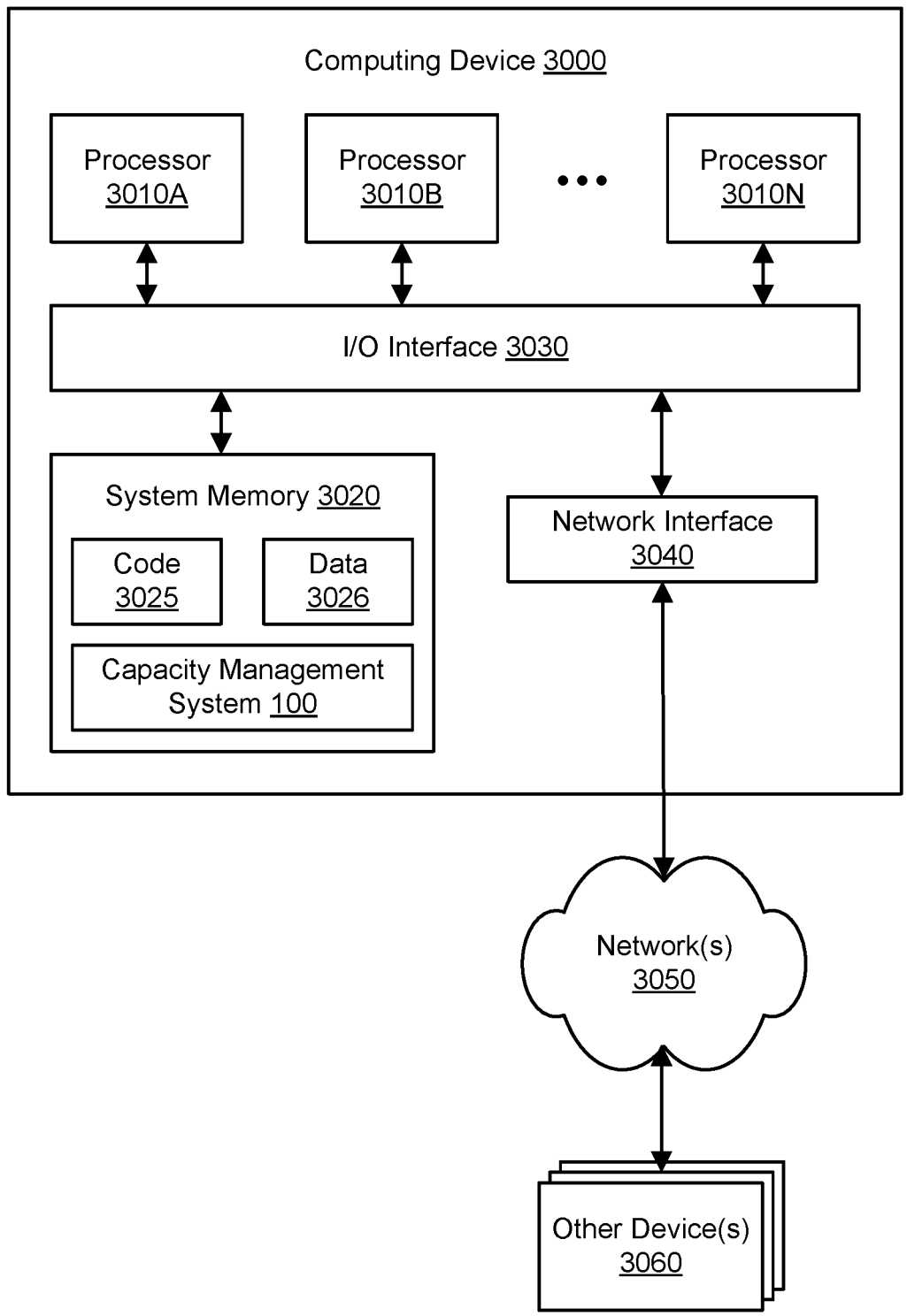
FIG. 8 illustrates an example computing device that may be used in some embodiments.

The capacity management system 100 may be implemented using any suitable number and configuration of computing devices, any of which may be implemented by the example computing device 3000 illustrated in FIG. 8. The computing devices may be located in any suitable number of data centers or geographical locations. In various embodiments, at least some of the functionality of the system 100 may be provided by the same computing device or by different computing devices. If any of the components of the system 100 are implemented using different computing devices, then the components and their respective computing devices may be communicatively coupled, e.g., via one or more networks. Each of the components of the system 100 may represent any combination of software and hardware usable to perform their respective functions, as discussed as follows. Operations implemented by the system 100 may be performed automatically, e.g., without a need for user initiation or user intervention after an initial configuration stage, and programmatically, e.g., by execution of program instructions on at least one computing device. It is contemplated that the system 100 and resource pool 150 may include additional components not shown, fewer components than shown, or different combinations, configurations, or quantities of the components shown.

A compute resource may include or be associated with one or more systems, services, or other components that implement tasks specified in a job request. Any of the systems, services, or other components of a compute resource may be built on one or more computing devices such as the example computing device 3000 as illustrated in FIG. 8. The compute resources may be implemented in various execution environments such as MapReduce-based cluster computing environments, stream processing systems, workflow systems such as Amazon Simple Workflow Service, and other suitable environments. In one embodiment, a compute resource may be implemented using a cluster of computing devices that cooperate to execute data transformations associated with job requests. In one embodiment, an orchestration framework such as Apache Hadoop or Apache Spark may be used to manage a cluster.

The system 100 and resource pool 150 may be implemented in a service-oriented system in which multiple services collaborate according to a service-oriented architecture. In such an environment, the system 100 may offer its functionality as service to multiple clients 190. In one embodiment, any of the clients 190 may provide one or more job requests 195A-195N to be executed using the resource pool 150. It is contemplated that any suitable number and configuration of clients 190 may interact with the system 100. To enable clients 190 to invoke its functionality, the system 100 may expose any suitable interface(s), such as one or more APIs or other programmatic interfaces and/or graphical user interfaces (GUIs). The system 100 may be implemented using a plurality of different instances of a service that are distributed throughout one or more networks, and each instance may offer access to the functionality of the corresponding service to various clients. The functionality of the system 100 and resource pool 150 may be offered to the clients 190 in exchange for fees.

One or more of the clients 190 may represent external devices, systems, or entities with respect to any services or components of the system 100 and/or resource pool 150. The client devices 190 may be implemented using any suitable number and configuration of computing devices, any of which may be implemented by the example computing device 3000 illustrated in FIG. 8. Clients 190 may convey network-based service requests to the system 100 via one or more networks, e.g., to supply the job requests 195A-195N. In various embodiments, the network(s) may encompass any suitable combination of networking hardware and protocols necessary to establish network-based communications between client device(s) 190 and the system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given client device and the system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the system 100. It is noted that in some embodiments, client devices 190 may communicate with the system 100 using a private network rather than the public Internet. In various embodiments, the system 100 may also communicate with the resource pool 150 using one or more network interconnects.

In one embodiment, aspects of the system 100, resource pool 150, and/or clients 190 may be implemented using computing resources of a provider network. A provider network may represent a network set up by an entity such as a private company or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network. For example, different ones of the compute resources in the pool 150 may be concurrently used for the processing of data by different clients.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients of the resource manager (potentially including other components within the provider network, such as the system 100) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 2:
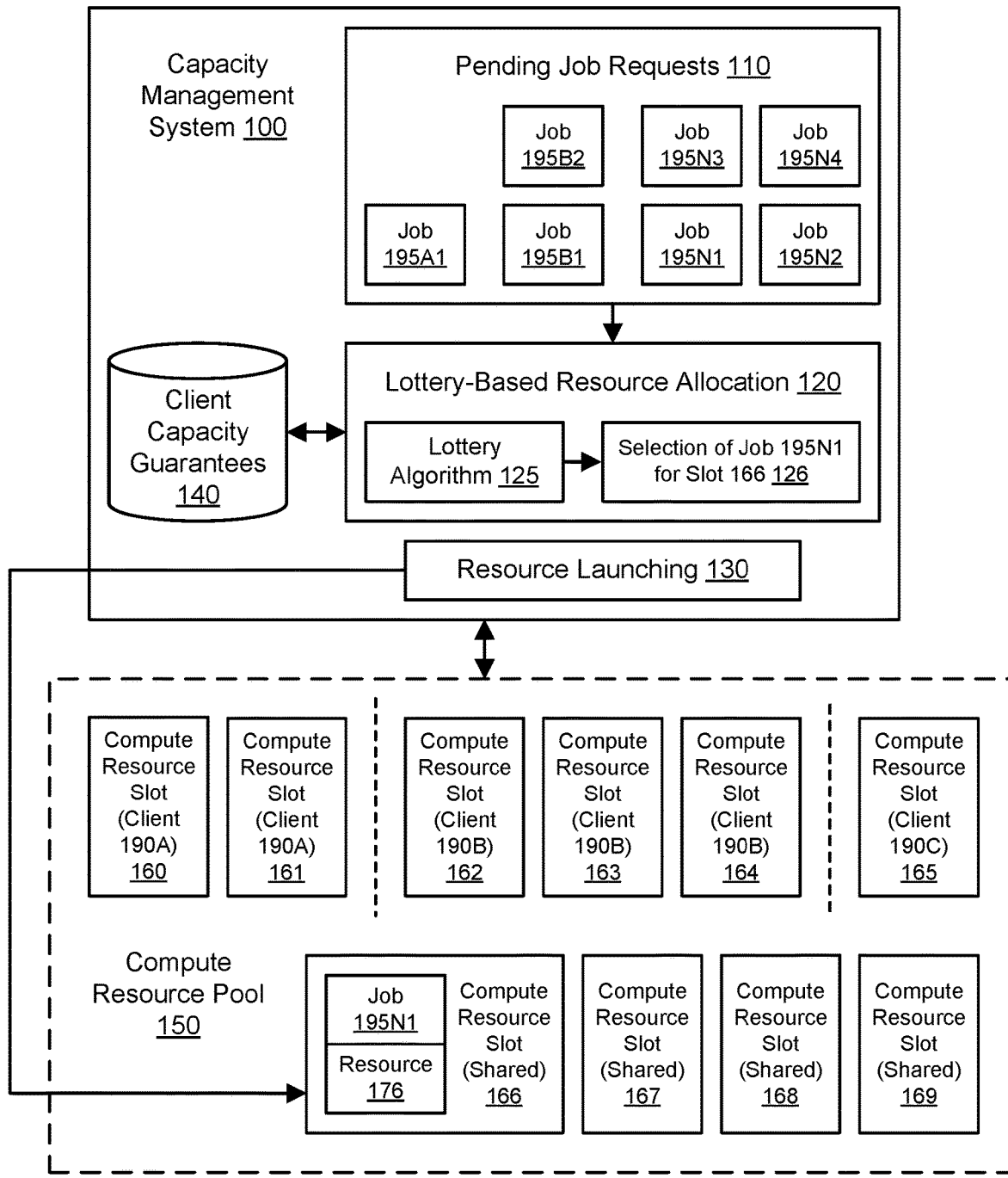
FIG. 2 illustrates further aspects of the example system environment for lottery-based resource allocation with capacity guarantees, including the selection of a job for a slot using a lottery algorithm and the launching of a compute resource in the slot, according to one embodiment.

FIG. 2 illustrates further aspects of the example system environment for lottery-based resource allocation with capacity guarantees, including the selection of a job for a slot using a lottery algorithm and the launching of a compute resource in the slot, according to one embodiment. As discussed above, job requests from clients 190A-190N may be submitted to the capacity management system 100 and held in a buffer or queue of pending job requests 110. For example, as shown in FIG. 2, at one point in time the pending job requests 110 may include one job 195A1 submitted by client 190A, two jobs 195B1 and 195B2 submitted by client 190B, and four jobs 195N1, 195N2, 195N3, and 195N4 submitted by client 190N. The system 100 may use a resource allocation component 120 to select a client for a slot that is empty and available for job execution. In the example of FIG. 2, when slot 166 is available for allocation, the resource allocation component 120 may select from among client 190A, client 190B, and client 190N as those are the clients represented in the pending job requests.

In one embodiment, the system 100 may fairly allocate slots to multiple clients, such as clients 190A, 190B, and 190N as shown in the example of FIG. 2. In one embodiment, the resource allocation component 120 may use an allocation method that aims to allocate compute capacity according to some fairness metric. In one embodiment, the resource allocation 120 may use a lottery algorithm 125 to make the selection 126 of a client (or job) for an open slot. In one embodiment, the lottery algorithm 125 may assign a number of "tickets" to each client with a pending request. The number of tickets assigned to a client may represent the client's probability of being allocated the available slot. The number of tickets may vary from client to client based on various factors. In one embodiment, the number of tickets may vary for a client based (at least in part) on the number of active jobs in the pool 150 for the particular client. In one embodiment, the number of tickets may vary for a client based (at least in part) on the number of total slots for all clients. In one embodiment, the number of tickets may vary for a client based (at least in part) on the number of dedicated slots for the particular client.

In various embodiments, any suitable allocation algorithms may be used by the resource allocation 120. In one embodiment, the algorithm 120 may assign a number of tickets for a particular client for a particular open slot according to a first expression: (1−number_of_active_jobs_for_client/total_slots_inpool)*100. For example, using such an algorithm 120, client 190A may be assigned 100 tickets if the client has no jobs already running in the ten slots 160-169. As another example, using the algorithm 120, the client 190B may be assigned 80 tickets if the client has two jobs already running in the ten slots 160-169. As yet another example, using the algorithm 120, the client 190N may be assigned 50 tickets if the client has five jobs already running in the ten slots 160-169. The lottery algorithm 120 may then select a winning ticket from among all the tickets assigned to all the clients with pending job requests. The number of tickets assigned to a particular client may vary from round to round (from available slot to available slot), and the total number of tickets assigned to all clients may also vary. Using the algorithm 120, the probability of a particular client being allocated a newly available slot may diminish as the client has more active jobs in the pool. Conversely, using the algorithm 120, the probability of a particular client being allocated a newly available slot may increase as the client has fewer active jobs in the pool.

In one embodiment, using the lottery algorithm 125, slots in a compute resource pool 150 may be allocated without regard to any association between those slots and particular clients. However, client capacity guarantees may also be respected so that a client that has not met its capacity guarantee may have a higher probability of being allocated a slot. In one embodiment, to observe client capacity guarantees 140, the algorithm 120 may assign a number of tickets for a particular client for an available slot according to a second expression: (1−number_of_active_jobs_for_client/total_dedicated_slots_for_client)*100. The total_dedicated_slots_for_client term may represent the capacity guarantee for the particular client. In one embodiment, tickets may be assigned using the second expression for a client with a capacity guarantee. For example, if client 190A has zero active jobs and two dedicated slots, then that client may be assigned 100 tickets using the second expression. As another example, if client 190B has two active jobs and three dedicated slots, then that client may be assigned 33 tickets using the second expression. In one embodiment, tickets assigned using the second expression may tend to be greater in number than if the client did not have a capacity guarantee. In one embodiment, if a client's capacity guarantee has been met, then zero tickets may be assigned to the client using the second expression, or the first expression may be used instead to assign a nonzero and positive number of tickets.

In the example of FIG. 2, the lottery algorithm 125 may produce a selection 126 of client 190N or job 195N1 for the available slot 166. That slot may then be used for execution of the job 195N1. In one embodiment, the lottery algorithm 125 may select a particular client for a slot, and the oldest job submitted by that client in the pending job requests 110 may be selected for the slot. In one embodiment, the lottery algorithm 125 may select a particular client for a slot, and a job submitted by that client may be selected for the slot based (at least in part) on analysis of job metadata. For example, one of the jobs submitted by client 190N may be selected for the slot 166 based on an estimated time of completion of the job in comparison to a client-submitted deadline. As another example, if job metadata indicates the relative priorities of jobs, the highest priority job pending for the client may be selected for the available slot.

In one embodiment, the resource launching component 130 may configure and launch a compute resource 176 for the job 195N1 in the slot 166. In one embodiment, the resource launching component 130 may interact with a resource manager of a multi-tenant provider network to select, reserve, provision, and/or configure an appropriate compute resource 176 from a set of available compute resources offered by the provider network. In one embodiment, the compute resource pool 150 may be associated with a set of compute resources that are substantially homogeneous in their capabilities and/or configuration. For example, a compute resource 176 launched into the slot 166 may include a compute cluster with a particular number of nodes, a particular processor configuration, a particular memory configuration, and so on. The system 100 may configure the launched resource 176 for execution of the particular job 195N1.

Figure 3A:
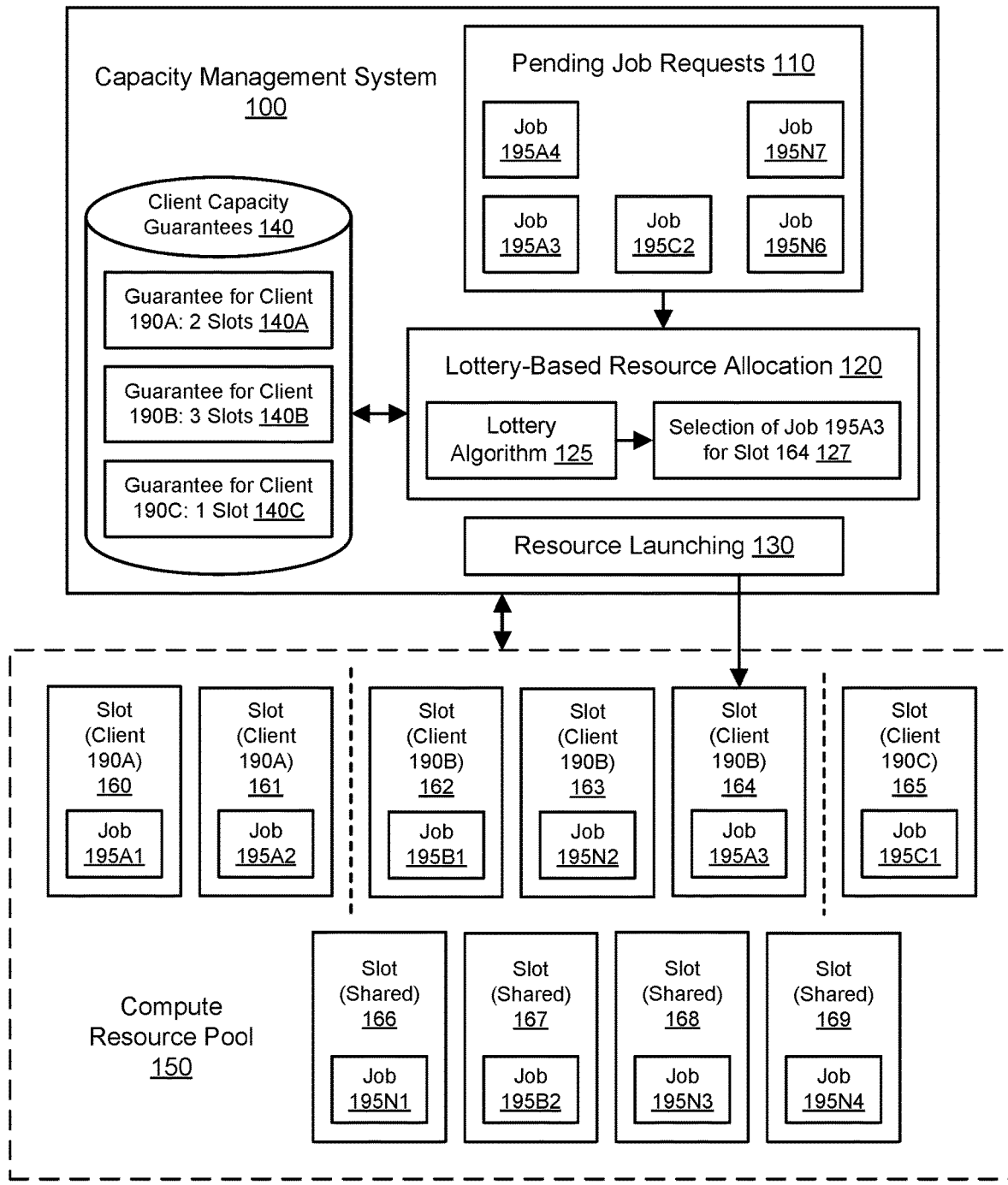
FIG. 3A and FIG. 3B illustrate further aspects of the example system environment for lottery-based resource allocation with capacity guarantees, including the selection of a job in excess of a capacity guarantee for a client, according to one embodiment.
Figure 3B:
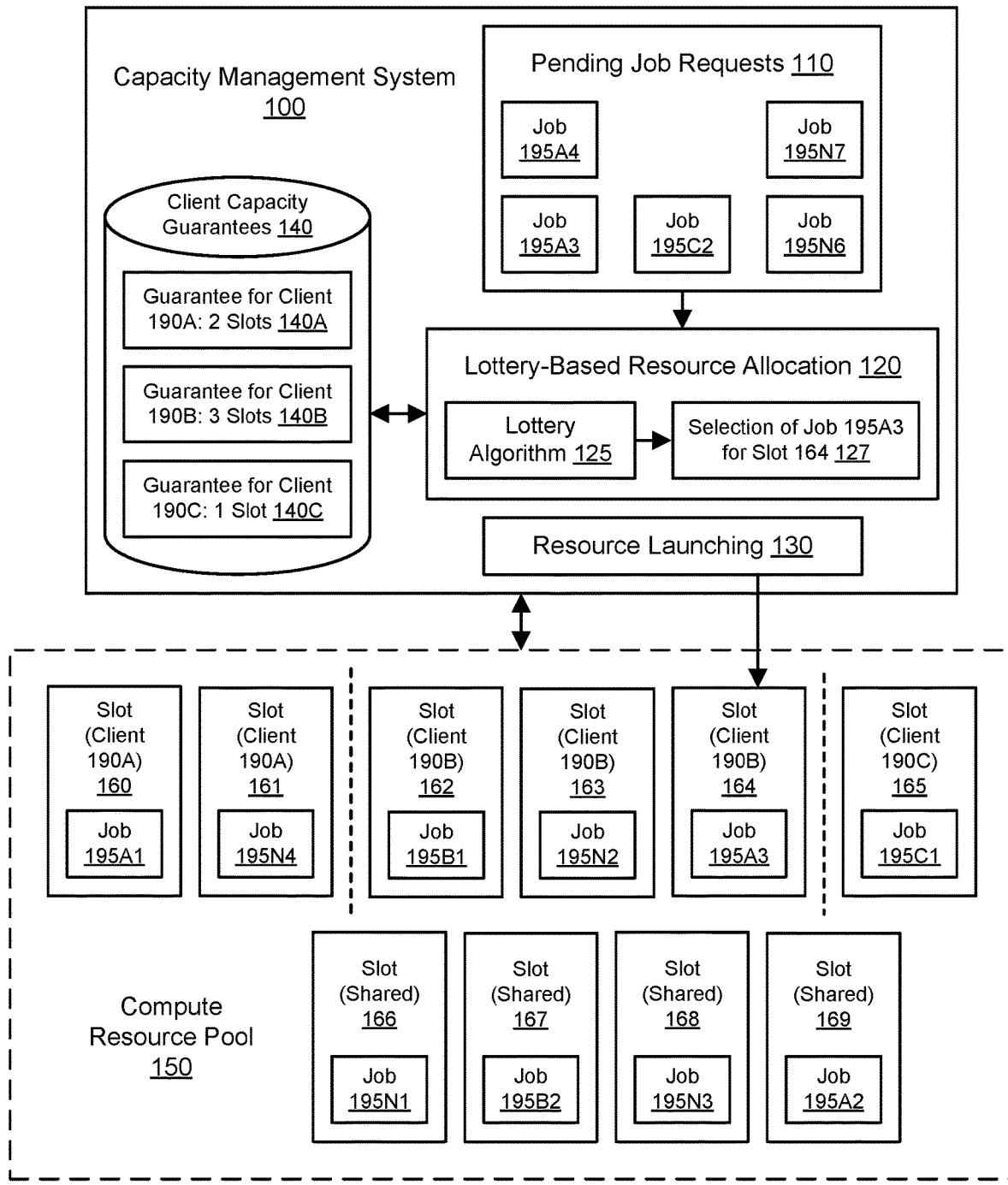

FIG. 3A and FIG. 3B illustrate further aspects of the example system environment for lottery-based resource allocation with capacity guarantees, including the selection of a job in excess of a capacity guarantee for a client, according to one embodiment. As shown in the example of FIG. 3A, client 190A may have a capacity guarantee 140A of two concurrent slots in the pool 150, client 190B may have a capacity guarantee 140B of three concurrent slots in the pool, and client 190C may have a capacity guarantee 140B of one concurrent slot in the pool. As discussed above, client capacity guarantees may be used to modify the number of tickets assigned to clients in a lottery for an available slot, e.g., by increasing the probability of allocation for a client whose capacity guarantee is unmet. In one embodiment, a client may be permitted to exceed its capacity guarantee by being allocated one or more additional slots beyond the number of dedicated slots for that client.

The example of FIG. 3A represents a point in time at which slot 164 has become available while the remaining nine slots are in use: slot 160 by job 195A1 (client 190A), slot 161 by job 195A2 (client 190A), slot 162 by job 195B1 (client 190B), slot 163 by job 195N2 (client 190N), slot 165 by job 195C1 (client 190C), slot 166 by job 195N1 (client 190N), slot 167 by job 195B2 (client 190B), slot 168 by job 195N3 (client 190N), and slot 169 by job 195N4 (client 190N). As discussed above, job requests from clients 190A-190N may be submitted to the capacity management system 100 and held in a buffer or queue of pending job requests 110. For example, as shown in FIG. 3A, at one point in time the pending job requests 110 may include two jobs 195A3 and 195A4 submitted by client 190A, one job 195C2 submitted by client 190C, and two jobs 195N6 and 195N7 submitted by client 190N. The system 100 may use a resource allocation component 120 to select a client for an available slot. In the example of FIG. 3A, when slot 164 is available for allocation, the resource allocation component 120 may select from among client 190A, client 190C, and client 190N as those are the clients represented in the pending job requests. In the example, the lottery algorithm 125 may produce a selection 127 of client 190A (or one of its pending jobs) for the available slot 164. Client 190A may be selected for the available slot 164 even though the client's capacity guarantee 140A of two slots has been met by the two active jobs 195A1 and 195A2. A pending job submitted by client 190, such as job 195A3, may then be assigned to the slot 164.

In one embodiment, slots in a compute resource pool 150 may be allocated without regard to any association between those slots and particular clients. As shown in the example of FIG. 3B, the slot 161 that appears to be dedicated to client 190A may actually be in use by job 195N4 from client 190N. The shared slot 169 may be in use by job 195A2 from client 190A. The two-slot capacity guarantee for client 190A may thus be considered met, even though the client's two jobs are distributed over the "dedicated" portion of the pool as well as the shared portion of the pool. Slot 164 may be assigned to client 190A, in excess of its capacity guarantee, as discussed above with respect to FIG. 3A. Using these techniques, the system 100 may observe client-specific capacity guarantees 140 while also equitably utilizing the compute resources of the pool 150. In one embodiment, the capacity management system 100 may increase the perception of fairness across all clients 190, e.g., as measured by a fairness metric.

Figure 4:
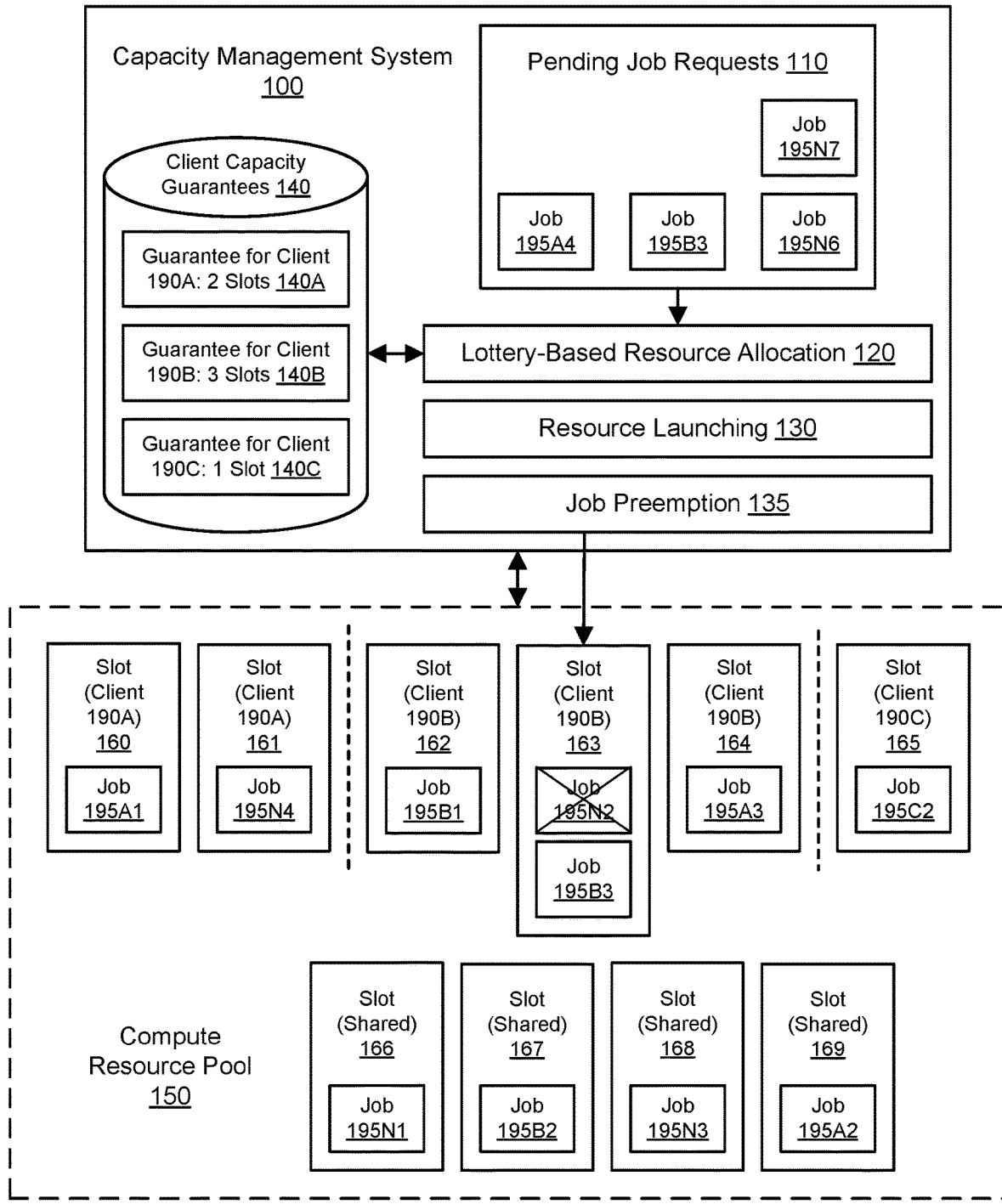
FIG. 4 illustrates further aspects of the example system environment for lottery-based resource allocation with capacity guarantees, including preemption of an existing job to meet the capacity guarantee for another client, according to one embodiment.

FIG. 4 illustrates further aspects of the example system environment for lottery-based resource allocation with capacity guarantees, including preemption of an existing job to meet the capacity guarantee for another client, according to one embodiment. In one embodiment, running jobs may be preempted by the capacity management system 100 in order to observe the capacity guarantees 140. As shown in the example of FIG. 4, client 190B may again have a capacity guarantee 140B of three concurrent slots in the resource pool 150. At a given point in time, the client 190B may have two jobs running in the pool: job 195B1 in slot 162 and job 195B2 in slot 167. At this point in time, the client 190B may submit an additional request for job 195B3. Because of the capacity guarantee 140B for the client 190B, the client 190B may expect that the new job 195B3 is run without delay. However, every slot in the pool 150 may be in use at this point in time: slot 160 by job 195A1 (client 190A), slot 161 by job 195N4 (client 190N), slot 162 by job 195B1 (client 190B), slot 163 by job 195N2 (client 190N), slot 164 by job 195A3 (client 190A), slot 165 by job 195C2 (client 190C), slot 166 by job 195N1 (client 190N), slot 167 by job 195B2 (client 190B), slot 168 by job 195N3 (client 190N), and slot 169 by job 195A2 (client 190A).

In one embodiment, to meet the capacity guarantee 140B for the client 190B, the system 100 may preempt a currently running job so that the new job 195B3 from the client 190B can be scheduled. As shown in the example of FIG. 4, the job 195N2 in slot 163 may be preempted, and the now-available slot 163 may be allocated to the new job. Using a job preemption component 135, the system 100 may terminate the processing of the job 195N2. The preempted job 195N2 may be placed back in the queue or buffer of pending job requests 110 for rescheduling, e.g., according to the lottery-based resource allocation 120. The job 195N2 may be selected for preemption on any suitable basis. In one embodiment, a job may be selected for preemption based (at least in part) on the client capacity guarantees 140, e.g., such that a client without a capacity guarantee (such as client 190N) or a client exceeding its capacity guarantee may have its job selected for preemption. In one embodiment, a job may be selected for preemption based (at least in part) on its presence in a slot dedicated to the client (e.g., client 190B) whose capacity guarantee is sought to be met by the preemption. In one embodiment, a job may be selected for preemption based (at least in part) on expectations that the preempted job can be rescheduled or resumed such that it can complete by a client-dictated deadline or to meet any other service-level agreement (SLA). In one embodiment, a preempted job may be preferentially scheduled with respect to other pending jobs such as job 195A4, job 195N6, and job 195N7. In one embodiment, a client may not be notified that its job has been preempted. In one embodiment, the system 100 may decide to increase the capacity of the pool rather than preempt any jobs. For example, the system 100 (or an operator thereof) may analyze the usage cost of additional resources and determine that the increased cost of adding the resources is more desirable than preempting jobs.

Figure 5:
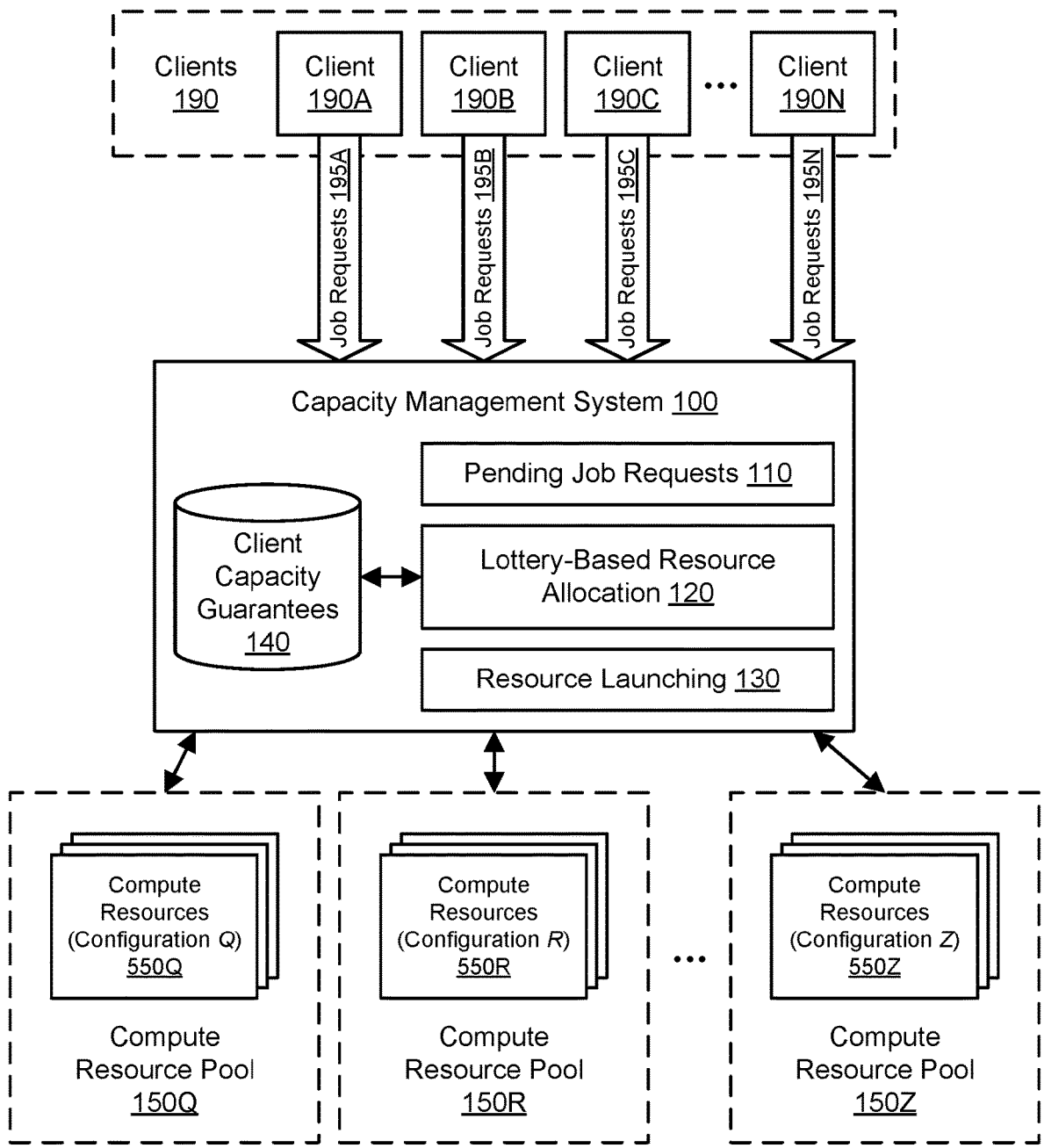
FIG. 5 illustrates further aspects of the example system environment for lottery-based resource allocation with capacity guarantees, including multiple heterogeneous pools of homogeneous compute resources, according to one embodiment.

FIG. 5 illustrates further aspects of the example system environment for lottery-based resource allocation with capacity guarantees, including multiple heterogeneous pools of homogeneous compute resources, according to one embodiment. As discussed above, a particular compute resource pool 150 may be associated with a set of compute resources that are substantially homogeneous in their capabilities and/or configuration. In one embodiment, the capacity management system 100 may offer access to multiple pools of compute resources, where one pool may differ from another in the capabilities or configuration of its constituent resources. As shown in the example of FIG. 5, the system 100 may allocate slots in various different pools including compute resource pool 150Q and compute resource pool 150R through compute resource pool 150Z. Pool 150Q may be associated with and used to launch compute resources 550Q of a configuration Q, while pool 150R may be associated with and used to launch compute resources 550R of another configuration R, and pool 150Z may be associated with and used to launch compute resources 550Z of yet another configuration Z. The configurations Q, R, and Z may differ in terms of their respective type of compute resources. For example, compute resources 550Q may represent individual compute instances of a particular instance type, compute resources 550R may represent individual compute instances of a different instance type, and compute resources 550Z may represent compute clusters having multiple nodes. The pools 150Q-150Z may differ in terms of their respective number of slots. In one embodiment, the capacity management system 100 may automatically assign job requests to particular ones of the pools 150Q-150Z, e.g., based on hardware requirements associated with the job requests. In one embodiment, the capacity management system may include different buffers or queues of pending job requests 110 that are specific to different pools 150Q-150Z.

Figure 6:
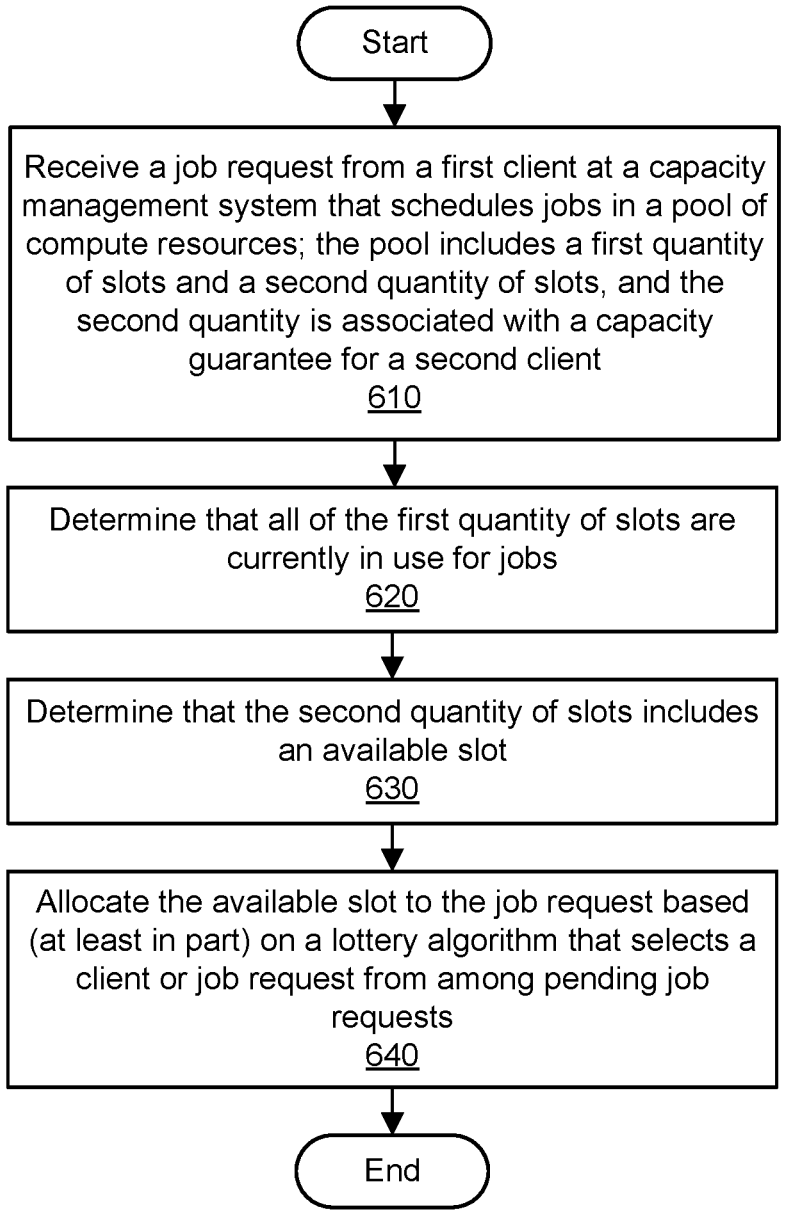
FIG. 6 is a flowchart illustrating a method for lottery-based resource allocation with capacity guarantees, according to one embodiment.

FIG. 6 is a flowchart illustrating a method for lottery-based resource allocation with capacity guarantees, according to one embodiment. As shown in 610, a job request may be received from a first client. The job request may be received at a capacity management system that schedules jobs in a pool of compute resources. The pool may include a first quantity of one or more slots that are guaranteed to one or more clients (e.g., the first client or another client). The pool may also include a second quantity of one or more slots that are guaranteed to a second client. The number of slots in the second set may represent a capacity guarantee for the second client. Slots may represent units of compute capacity in the pool, e.g., such that at least one compute resource may be launched in a slot to run a client-submitted job.

As shown in 620, the method may determine that all of the slots in the first quantity of slots are in use. A slot may be considered in use if it is occupied by a compute resource running a client-submitted job. As shown in 630, the method may determine that not all of the slots in the second quantity of slots are in use. The second quantity of slots may thus include an available slot. In one embodiment, one or more of the second slots may be available if the second client is relatively idle at a given time and not supplying a sufficient number of job requests to use its guaranteed capacity.

Figure 7:
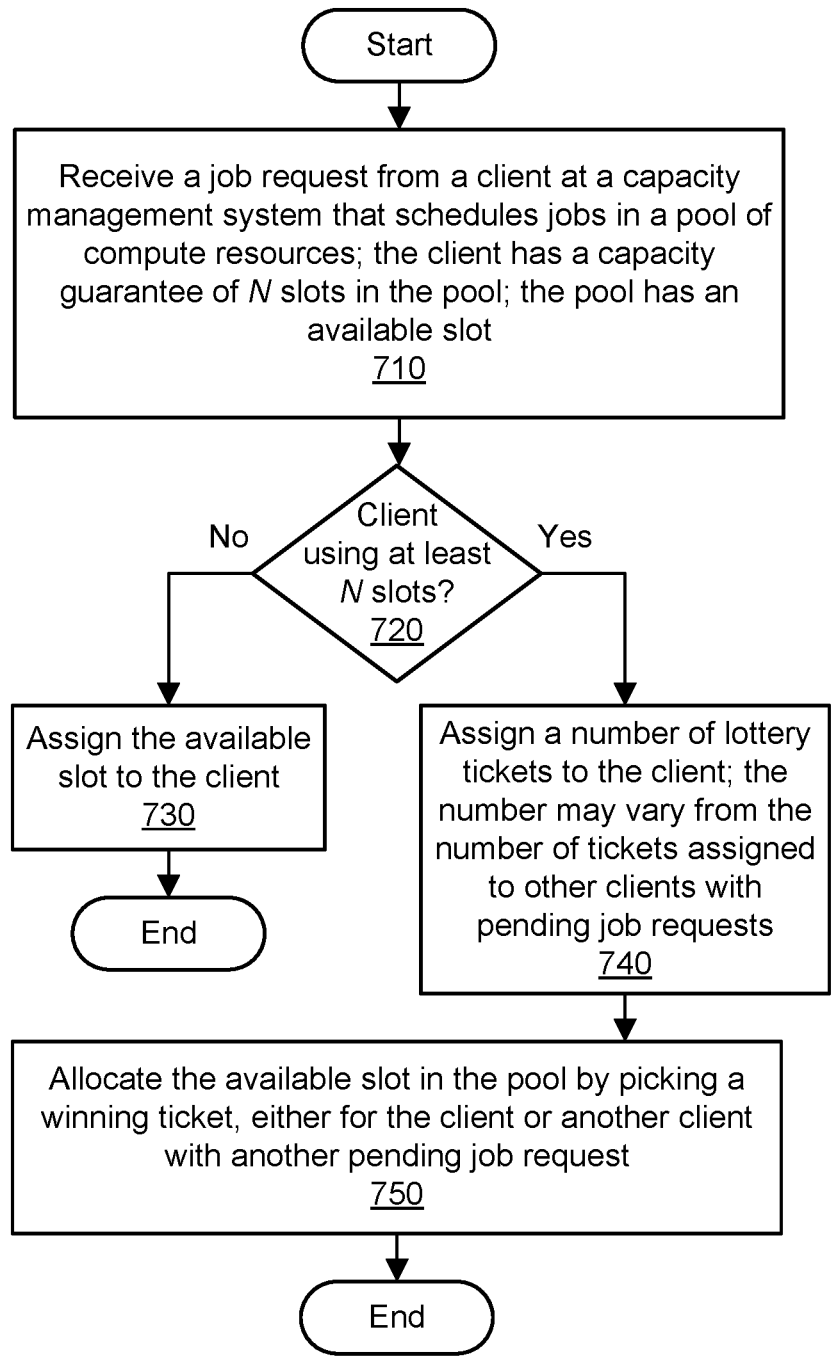
FIG. 7 is a flowchart illustrating a method for lottery-based resource allocation with capacity guarantees, including differential treatment of a job request based (at least in part) on a capacity guarantee for the client, according to one embodiment.

As shown in 640, the available slot in the second quantity of slots may be allocated to the job request from the first client. In one embodiment, the slot may be allocated based (at least in part) on a lottery algorithm that assigns differing numbers of tickets (or other probabilities) to different clients with pending job requests and then selects a winning ticket. In one embodiment, the available slot in the second quantity of slots may be allocated to the first client even though the slot is dedicated to the second client. Using this method, the capacity management system may observe client-specific capacity guarantees while also equitably utilizing the compute resources of the pool. In one embodiment, the capacity management system may increase the perception of fairness across all clients, e.g., as measured by a fairness metric FIG. 7 is a flowchart illustrating a method for lottery-based resource allocation with capacity guarantees, including differential treatment of a job request based (at least in part) on a capacity guarantee for the client, according to one embodiment. As shown in 710, a job request may be received from a client. The job request may be received at a capacity management system that schedules jobs in a pool of compute resources. The client may have a capacity guarantee of N slots in the pool. Slots may represent units of compute capacity in the pool, e.g., such that at least one compute resource may be launched in a slot to run a client-submitted job. At the time the job request is submitted, the pool may have an available slot. Other job requests may be pending, and the available slot may be allocated by lottery to one of the clients with pending requests.

The allocation of the available slot to the client may vary based (at least in part) on whether the capacity guarantee for a client has been met. The capacity guarantee of N may be deemed met if the client has at least N jobs running concurrently in the pool and/or is using at least N slots in the pool to run its job requests. As shown in 720, the method may determine whether the client is using at least N slots. If not, then the capacity guarantee for the client is not met, and as shown in 730, the method may allocate the slot to the client. In one embodiment, the slot may be allocated to the client with an unmet capacity guarantee without performing a lottery, e.g., if no other client with an unmet capacity guarantee has a pending job request. In one embodiment, the slot may be allocated to the client with an unmet capacity guarantee using a lottery, e.g., if at least one other client with an unmet capacity guarantee has a pending job request. To perform the lottery, the method may assign a number of tickets (or other probability) to the client or job request based (at least in part) on the capacity guarantee. For example, the method may assign tickets to a client with an unmet capacity guarantee according to the following expression that includes a term representing the capacity guarantee: (1−number_of_active_jobs_for_client/total_dedicated_slots_for_client)*100.

If the client is instead using at least N slots, then as shown in 740, the method may assign a number of tickets (or other probability) to the client or job request, e.g., without regard to the capacity guarantee. For example, the method may assign tickets to the client according to the following expression that does not include a term representing the capacity guarantee: (1−number_of_active_jobs_for_client/total_slots_in_pool)*100.

As shown in 750, the allocation algorithm may then select a winning ticket from among all the tickets assigned to all the clients with pending job requests and allocate the available slot to the client associated with the winning ticket. The number of tickets assigned to a particular client may vary from round to round (from available slot to available slot), and the total number of tickets assigned to all clients may also vary. Using the lottery algorithm, the probability of a particular client being allocated a newly available slot may diminish as the client has more active jobs in the pool. Conversely, using the lottery algorithm, the probability of a particular client being allocated a newly available slot may increase as the client has fewer active jobs in the pool.

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of at least one computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a pool of compute resources of a multi-client provider network; and
one or more computing devices configured to implement a capacity management system that schedules jobs in the pool of compute resources of the multi-client provider network, wherein the capacity management system is configured to:
receive a job request from a first client of the provider network, wherein a first capacity guarantee with respect to a first quantity of one or more slots in the pool of compute resources of the provider network is associated with the first client, and wherein a second capacity guarantee with respect to a second quantity of one or more slots in the pool of compute resources of the provider network is associated with a second client;
determine that the first quantity of one or more slots associated with the first capacity guarantee for the first client are in use by one or more compute resources of the provider network executing one or more jobs requested by the first client and initiated prior to receiving the job request;
determine that the second quantity of one or more slots associated with the second capacity guarantee for the second client are not all in use by one or more compute resources of the provider network executing one or more jobs requested by the second client, and comprises an available slot;
allocate the available slot of the second quantity of one or more slots associated with the second capacity guarantee for the second client to the job request from the first client, wherein the available slot of the second quantity of one or more slots associated with the second capacity guarantee for the second client is allocated based at least in part on a lottery algorithm; and
perform the job request from the first client using a compute resource of the provider network in the available slot of the second quantity of one or more slots associated with the second capacity guarantee for the second client.

2. The system as recited in claim 1, wherein the lottery algorithm assigns a first number of tickets to the first client and an additional number of tickets to one or more additional clients, and wherein the first number of tickets is based at least in part on a number of active jobs associated with the first client and the first quantity of one or more slots.

3. The system as recited in claim 1, wherein the capacity management system is further configured to:
receive an additional job request from a third client, wherein the pool of compute resources comprises no slots guaranteed to the third client;
determine that the first quantity of one or more slots comprises a newly available slot; and
allocate the newly available slot to the third client.

4. The system as recited in claim 1, wherein a total number of compute resources in the pool is exceeded by a total number of guaranteed slots in the first quantity of one or more slots, the second quantity of one or more slots, and an additional quantity of one or more slots.

5. A computer-implemented method, comprising:
receiving a job request from a first client of a multi-client provider network, wherein the job request is submitted to a capacity management system that schedules jobs in a pool of compute resources of the multi-client provider network, wherein the pool of compute resources of the provider network comprises a first quantity of one or more slots and a second quantity of one or more slots, wherein the first quantity of one or more slots is associated with a first capacity guarantee for the first client, and wherein the second quantity of one or more slots is associated with a second capacity guarantee for a second client;
determining that the first quantity of one or more slots associated with the first capacity guarantee for the first client are in use by one or more compute resources of the provider network executing one or more jobs initiated prior to receiving the job request;

determining that the second quantity of one or more slots associated with the second capacity guarantee for the second client are not all in use by one or more compute resources of the provider network executing one or more jobs requested by the second client, and comprises an available slot; and allocating the available slot of the second quantity of one or more slots associated with the second capacity guarantee for the second client to the job request from the first client.

6. The method as recited in claim 5, wherein the available slot is allocated to the first client based at least in part on a lottery algorithm, wherein the lottery algorithm assigns a first number of tickets to the first client and an additional number of tickets to one or more additional clients, and wherein the first number of tickets is based at least in part on a number of active jobs associated with the first client and a total number of the first quantity of one or more slots.

7. The method as recited in claim 5, wherein the one or more jobs occupying the first quantity of one or more slots are associated with one or more additional clients.

8. The method as recited in claim 5, wherein the one or more jobs occupying the first quantity of one or more slots are associated with the first client.

9. The method as recited in claim 5, wherein the method further comprises:
   receiving an additional job request from a third client, wherein the pool of compute resources comprises no slots dedicated to the third client;
   determining that the first quantity of one or more slots comprises an additional available slot; and
   allocating the additional available slot to the additional job request.

10. The method as recited in claim 5, wherein the job request is received via a first job queue associated with the first client, and wherein an additional job request is received via a second job queue associated with the second client.

11. The method as recited in claim 5, wherein a total number of compute resources in the pool is exceeded by a total number of guaranteed slots in the first quantity of one or more slots, the second quantity of one or more slots, and an additional quantity of one or more slots.

12. The method as recited in claim 5, further comprising:
   launching a compute resource in the available slot after allocating the available slot; and
   performing the job request using the compute resource.

13. The method as recited in claim 5, wherein the plurality of compute resources comprise a plurality of compute clusters, wherein an individual one of the compute clusters comprises a plurality of compute nodes.

14. The method as recited in claim 5, further comprising:
   increasing a capacity of the pool of compute resources in order to meet one or more capacity guarantees for one or more clients.

15. One or more non-transitory computer-readable storage media storing program instructions that, when executed on or across one or more processors, perform:
   receiving a job request from a first client of a multi-client provider network, wherein the job request is submitted to a capacity management system that schedules jobs in a pool of compute resources of the multi-client provider network, wherein the first client is guaranteed access to a first quantity of one or more slots in the pool of compute resources of the provider network, and wherein a second client is guaranteed access to a second quantity of one or more slots in the pool of compute resources of the provider network;
   determining that the first quantity of one or more slots to which the first client is guaranteed access are in use by one or more compute resources of the provider network executing one or more jobs requested by the first client;
   determining that the second quantity of one or more slots to which the second client is guaranteed access are not all in use by one or more compute resources of the provider network executing one or more jobs requested by the second client, and comprises an available slot; and
   based at least in part on a lottery algorithm, allocating a compute resource of the provider network in the available slot, of the second quantity of one or more slots to which the second client is guaranteed access, to the job request from the first client.

16. The one or more non-transitory computer-readable storage media as recited in claim 15, wherein the lottery algorithm assigns a first number of tickets to the first client and an additional number of tickets to one or more additional clients, and wherein the first number of tickets is based at least in part on a number of active jobs associated with the first client and the first quantity of one or more slots.

17. The one or more non-transitory computer-readable storage media as recited in claim 15, wherein the program instructions are further computer-executable to perform:
   receiving an additional job request from a third client, wherein the pool of compute resources comprises no slots guaranteed to the third client;
   determining that the first quantity of one or more slots comprises an additional available slot; and
   allocating the additional available slot to the additional job request.

18. The one or more non-transitory computer-readable storage media as recited in claim 15, wherein a total number of compute resources in the pool is exceeded by a total number of guaranteed slots in the first quantity of one or more slots, the second quantity of one or more slots, and an additional quantity of one or more slots.

19. The one or more non-transitory computer-readable storage media as recited in claim 15, wherein the program instructions are further computer-executable to perform:
   receiving an additional job request from the first client;
   determining that the first quantity of one or more slots are in use by one or more current jobs, including a job requested by an additional client;
   preempting the job requested by the additional client; and
   allocating, to the additional job request received from the first client, a slot vacated by the job requested by the additional client.

20. The one or more non-transitory computer-readable storage media as recited in claim 19, wherein the program instructions are further computer-executable to perform:
   rescheduling the job requested by the additional client using the lottery algorithm.

* * * * *